(12) United States Patent
Goldberg et al.

(10) Patent No.: US 10,579,553 B2
(45) Date of Patent: Mar. 3, 2020

(54) STORAGE CAPABILITY AWARE SOFTWARE DEFINED STORAGE

(71) Applicant: International Business Machines Corporation, Armonk, NY (US)

(72) Inventors: Itzhack Goldberg, Hadera (IL); Gregory T. Kishi, Oro Valley, AZ (US); David B. Kumhyr, Austin, TX (US); Neil Sondhi, Pilisborosjeno (HU)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 15/458,136

(22) Filed: Mar. 14, 2017

(65) Prior Publication Data

US 2018/0267910 A1  Sep. 20, 2018

(51) Int. Cl.
*G06F 13/16* (2006.01)
*G06F 3/06* (2006.01)
*G06F 13/42* (2006.01)

(52) U.S. Cl.
CPC ........ *G06F 13/1673* (2013.01); *G06F 3/0604* (2013.01); *G06F 3/067* (2013.01); *G06F 3/0643* (2013.01); *G06F 13/4282* (2013.01)

(58) Field of Classification Search
None
See application file for complete search history.

(56) References Cited

U.S. PATENT DOCUMENTS

| | | | | |
|---|---|---|---|---|
| 6,145,028 A | * | 11/2000 | Shank | G06F 3/0607 710/31 |
| 8,510,265 B1 | * | 8/2013 | Boone | G06F 16/1827 707/609 |
| 8,516,164 B2 | | 8/2013 | Bakke et al. | |
| 8,589,550 B1 | * | 11/2013 | Faibish | G06F 3/067 707/E17.01 |
| 8,799,335 B2 | * | 8/2014 | Eshel | G06F 16/1824 707/826 |

(Continued)

FOREIGN PATENT DOCUMENTS

| | | |
|---|---|---|
| CN | 101145941 | 3/2008 |
| CN | 104598837 | 3/2016 |

OTHER PUBLICATIONS

'Storage Protocol Comparison White Paper' by Vmware, Apr. 2012. (Year: 2012).*

(Continued)

*Primary Examiner* — Steven G Snyder
(74) *Attorney, Agent, or Firm* — Lieberman & Brandsdorfer, LLC

(57) ABSTRACT

Adaptive control of Input/Output (I/O) operations in a data storage system is provided to enable efficient use of the data storage system. More specifically, an interface is provided in order to adaptively control I/O operations to the data storage system. The interface receives a data request. The interface mediates with the data storage system and employs a handle which references one or more files. The handle designates how to process the data request associated with the referenced one or more files. The interface supports execution of the data request in accordance with the handle. Accordingly, the interface provides adaptive direct management of the data storage system at file granularity and/or at data request granularity as designated in the handle(s).

15 Claims, 8 Drawing Sheets

(56) References Cited

U.S. PATENT DOCUMENTS

| | | | |
|---|---|---|---|
| 9,059,976 B2 | 6/2015 | Lacapra | |
| 9,164,702 B1* | 10/2015 | Nesbit | G06F 3/067 |
| 9,229,901 B1* | 1/2016 | Nesbit | G06F 15/17331 |
| 9,378,091 B2* | 6/2016 | Dhuse | H04N 7/17336 |
| 9,471,807 B1* | 10/2016 | Chakraborty | G06F 21/6227 |
| 2002/0078244 A1* | 6/2002 | Howard | G06F 16/1865 |
| | | | 709/248 |
| 2005/0097243 A1* | 5/2005 | Yamashita | G06F 3/0605 |
| | | | 710/38 |
| 2007/0088702 A1* | 4/2007 | Fridella | H04L 29/12169 |
| 2009/0222509 A1* | 9/2009 | King | G06F 16/182 |
| | | | 709/203 |
| 2014/0122970 A1* | 5/2014 | Dhuse | H04N 7/17336 |
| | | | 714/764 |
| 2015/0071123 A1* | 3/2015 | Sabaa | H04L 67/1004 |
| | | | 370/255 |
| 2016/0077761 A1* | 3/2016 | Stabrawa | G06F 3/0604 |
| | | | 711/172 |
| 2016/0239239 A1 | 8/2016 | Tin et al. | |
| 2016/0283127 A1* | 9/2016 | Stabrawa | G06F 12/10 |
| 2016/0299697 A1 | 10/2016 | Chen et al. | |
| 2016/0337272 A1* | 11/2016 | Berman | H04L 49/70 |
| 2017/0010978 A1* | 1/2017 | Stabrawa | G06F 12/1081 |
| 2017/0171310 A1* | 6/2017 | Gardner | H04L 67/1097 |

OTHER PUBLICATIONS

Thereska, E. et al., IOFlow: A Software-Defined Storage Architecture. Proceedings of the Twenty-Fourth ACM Symposium on Operating Systems Principles, pp. 182-196, 2013.

Anonymous, Method and Apparatus to Determine Storage Usage and Backend Mapping by Applications on Software Defined Storage Systems, IPCOM000240938D, Mar. 12, 2015.

* cited by examiner

STORAGE CAPABILITY AWARE SOFTWARE DEFINED STORAGE

BACKGROUND

The present embodiments relate to software defined storage. More specifically, the embodiments relate to adaptive direct management of data storage, including control of storage space and storage devices.

A data storage system is typically comprised of one or more physical storage devices, with each device configured to store digital information. There are various types of physical storage devices used within data storage systems and each type has its own respective parameters, such as size, protocols, speed, cost, etc. Storage virtualization provides separation of underlying physical storage device from the software that manages the storage infrastructure. Storage virtualization enables abstraction and policy management of multiple storage devices and pooling of underlying hardware resources.

Storage space is typically an on demand resource in a computer system. Latency associated with access of the storage system can be a point of contention for one or more transactions within a computer system. Information stored as data in a data storage system may be in various types (e.g. documents, tables, images, music, etc.) and sizes with each type having respective requirements. Similarly, the data and may be stored by different applications and owned by different entities, with each application and entity, respectively, having respective requirements. Accordingly, the requirements for data may determine which storage protocols are used in the data storage system to support the application.

SUMMARY

A system, computer program product, and method are provided for adaptive direct management of a data storage system. More specifically, embodiments relate to a software defined storage interface for adaptive adjustment of data storage protocols based on an associated handle.

In one aspect, a system is provided with a processing unit in communication with memory, and an interface in communication with the processing unit to adaptively control Input/Output operations to a storage system. The interface defines a mapping between one or more files and one or more storage entities. The interface employs one or more handles as an object that references the one or more files. Each handle has one or more storage protocols for the one or more files. The interface supports the data request to the storage system according to at least one handle associated with the data request and the mapping. The data request is executed, with the execution including a mediation with the storage system in accordance with the at least one handle. An execution path of the supported data request is selected responsive to the mediation.

In another aspect, a computer program product is provided for adaptive direct management of a storage system. The computer program product includes a computer readable storage medium with embodied program code that is configured to be executed by a processing unit. Program code configures an interface to adaptively control Input/Output operations to a storage system. Program code defines a mapping between one or more files and one or more storage entities. Program code employs one or more handles as an object that references the one or more files. Each handle has one or more storage protocols for the one or more files. Program code supports the data request to the storage system according to at least one handle associated with the data request and the mapping. The data request is executed, with the execution of the associated program code including a mediation with the storage system in accordance with the at least one handle. An execution path of the supported data request is selected responsive to the mediation.

In yet another aspect, a method is provided for adaptively directing management of a storage system. An interface if configured to adaptively control Input/Output operations to a storage system. A mapping is defined between one or more files and one or more storage entities. One or more handles are employed as an object that references the one or more files. Each handle has one or more storage protocols for the one or more files. The data request to the storage system is supported according to at least one handle associated with the data request and the mapping. The data request is executed including mediating with the storage system in accordance with the at least one handle. An execution path of the supported data request is selected responsive to the mediation.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
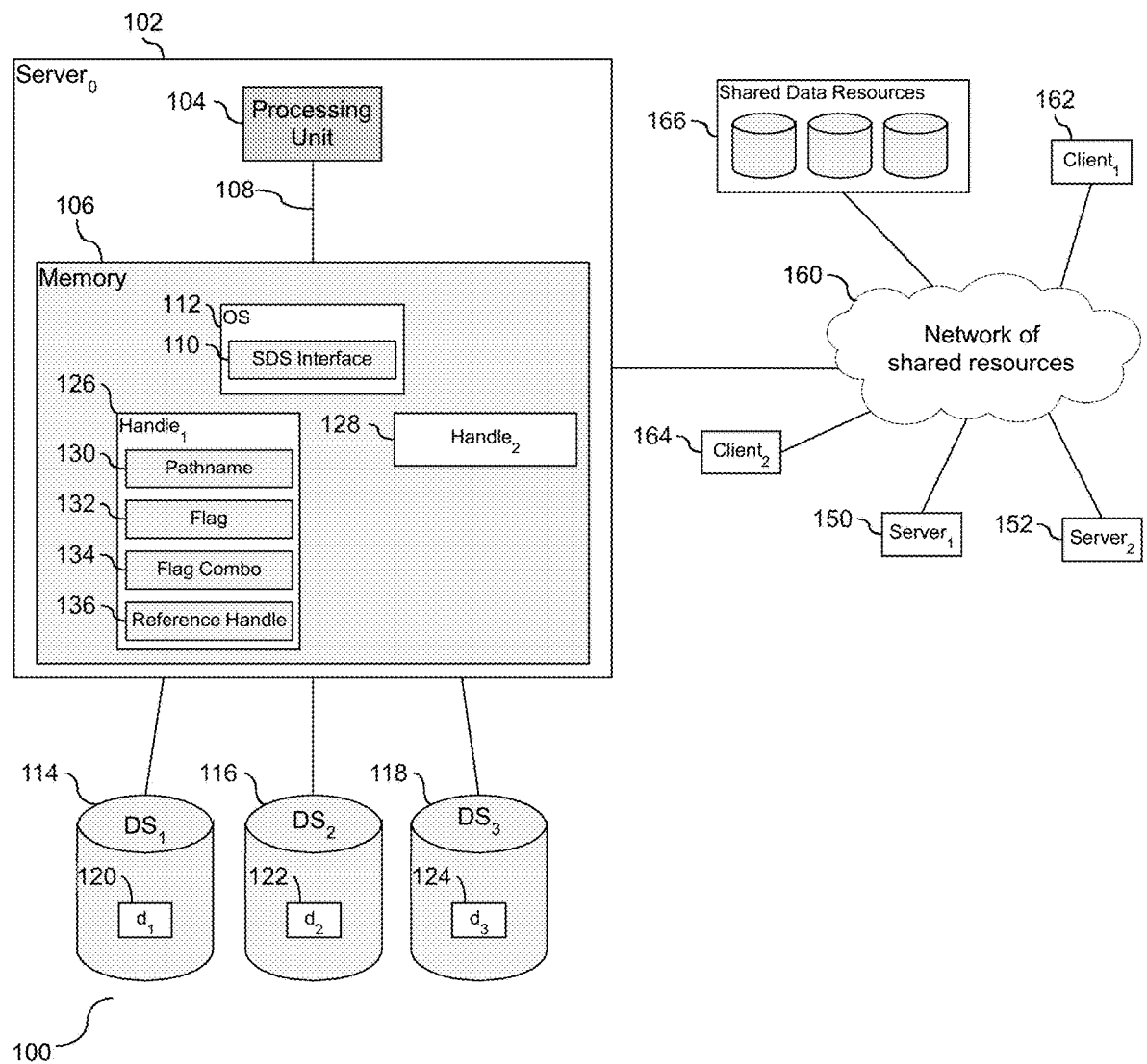
FIG. 1 depicts a block diagram illustrating a computer system that supports software defined storage protocols for adaptive control of I/O operations.

It will be readily understood that the components of the present embodiments, as generally described and illustrated in the Figures herein, may be arranged and designed in a wide variety of different configurations. Thus, the following detailed description of the embodiments of the apparatus, system, and method of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment of the present embodiments. Thus, appearances of the phrases "a select embodiment," "in one embodiment," or "in an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Not all data is equal. Data stored in a data storage system may have different requirements with respect to other data stored within the data storage system. For example, data may have different storage, de-duplication, reliability, compression, thin provisioning, snapshot, security, and backup requirements. In one embodiment, data de-duplication may create security vulnerability where the data storage system may indicate which users are using the same block. In another embodiment, compressing data may cause latency in processing data. In another embodiment, designating global policies to a data storage system may not provide storage policies which align for all files stored in the data storage system while efficiently using the available storage space.

A system, method, and computer program product are disclosed and described herein to enable adaptive control of Input/Output (I/O) operations in a data storage system which facilitates efficient use of the data storage system. The adaptive control dynamically defines storage policies for the data storage system at data request granularity and/or file granularity. The storage policies are versatile and account for varying requirements of the underlying data in the data storage system while efficiently using storage space. In one embodiment, an interface is provided in order to adaptively control I/O operations to the data storage system. The interface mediates the data storage system and employs a handle which references one or more files. The handle designates how to process the data request associated with the referenced one or more files. Accordingly, the data storage system as supported by the interface and one or more handles is not restricted to global policies and may be adaptively managed at file granularity and/or at data request granularity.

Referring to FIG. 1, a block diagram (100) is provided illustrating a computer system that supports software defined storage for adaptive control of I/O operations. A server, server$_0$ (102), is shown configured with a processing unit (104) in communication with a memory (106) across a bus (108). Server$_0$ (102) is also shown in communication with a network of shared resources (160) across a network connection to provide access to shared resources, including, but not limited to, shared data resources (166), client machines, client$_1$ (162) and client$_2$ (164), and other servers, server$_1$ (150) and server$_2$ (152). The quantity of client machines, servers, and data resources shown and described herein are for illustrative purposes and should not be considered limiting.

Server$_0$ (102) is operatively coupled to local data storage, DS$_1$ (114), DS$_2$ (116), and DS$_3$ (118). Local date storage, DS$_1$ (114) is configured with data, d$_1$ (120). Similarly, local data storage, DS$_2$ (116) is configured data, d$_2$ (122), and local data storage, DS$_3$ (118) is configured with data, d$_3$ (124). Local data storage, DS$_1$ (114), DS$_2$ (116), and DS$_3$ (118) and shared data resources (166) are hereinafter referred to as storage entities. Data, d$_1$ (120), d$_2$ (122), and d$_3$ (124) and local data storage, DS$_1$ (114), DS$_2$ (116), and DS$_3$ (118), as shown and described herein is for illustrative purposes and the type, and/or size should not be considered limiting.

Server$_0$ (102) is configured with a software defined storage (SDS) interface (110) which adaptively controls I/O operations to one or more data storage systems. As shown, the SDS interface (110) is stored in memory (106) for execution by processing unit (104), although in one embodiment, the SDS interface (110) may be in the form of an application operatively coupled to the memory (106) for execution by the processing unit (104). In another embodiment, the SDS interface (110) is provided as an application platform interface (API). The SDS interface (110) is in communication with local data storage, DS$_1$ (114), and in one embodiment, DS$_2$ (116), and DS$_3$ (118). In one embodiment, the SDS interface (110) is in communication with shared data resources (166) and the functionality of the SDS may be applied with respect to the shared data resources (166). In one embodiment, SDS interface is within an operation system (OS) (112) embedded in memory (106). Accordingly, the quantity and location of data storage and data shown herein is for illustrative purposes and should not be considered limiting.

The SDS interface (110) includes a plurality of functions to support I/O operations, including creating handles, writing, reading, opening, and closing data, and/or defining mapping of data. For example, SDS interface (110) may perform an I/O operation such as, but not limited to, read, write, open, and close on data such as, but not limited to, d$_1$ (120), d$_2$ (122), and d$_3$ (124). As used herein, a data request is a message submitted by a requestor to perform an I/O operation. The SDS interface (110) supports I/O operations based on one or more handles, such as handle$_1$ (126) and handle$_2$ (128). For example, an execution path for a data request may be chosen based on a handle, such as handle$_1$ (126). Accordingly, the SDS interface (110) adaptively supports I/O operations in accordance with one or more handles, such as handle$_1$ (126) and handle$_2$ (128).

The SDS Interface (110) directly manages and mediates with local data storage, DS$_1$ (114), and in one embodiment DS$_2$ (116) and DS$_3$ (118). In one embodiment, the SDS interface (110) directly manages and mediates with shared data resources (166). The mediation includes the SDS interface (110) to communicate with the data storage and the SDS interface (110) to determine one or more parameters of the data storage such as speed, size, format, available storage space, etc. in order to support the I/O operation. In one embodiment, the mediation may include a query of shared data resources, a storage array, local data storage, etc., with the query facilitating determination by the SDS interface (110) of an appropriate storage protocol. The SDS interface (110) may define a mapping between data and the data storage. For instance, the SDS may decide which data storage, DS$_1$ (114), DS$_2$ (116) or DS$_3$ (118), to use and the address (e.g. byte ranges) within the data storage to support the associated data request. In one embodiment, the mapping includes a quantity of copies of the data to be stored and one or more locations for data storage. In one embodiment, the mapping includes creation of one or more handles, such as $handle_1$ (126) and $handle_2$ (128). Accordingly, the SDS interface (110) mediates and directly manages data storage.

The SDS interface (110) in conjunction with the OS (112) may provide a different file descriptor for each copy of a file in data storage. In one embodiment, providing different file descriptors for different copies of a file enables the SDS interface (110) to individually manipulate and/or control each copy of the same file. More specifically, the descriptors are directed at the individual copy of the data file. The individual manipulation enables adaptive control of storage policies at data request granularity and/or file granularity in order to dynamically account for the respective requirements of each file copy. Accordingly, with the support of the descriptors, different copies of the same file may be stored in data storage with each copy having different storage protocols.

For example, in one embodiment, $d_1$ (120), $d_2$ (122), and $d_3$ (124) are copies of the same file stored separately on different data storage devices for redundancy. In this example, $DS_1$ (114) is a high speed storage device, and $DS_2$ (116) is a lower speed storage device than $DS_1$ (114). Performing data operations to a first copy of data, $d_1$ (120), in the high speed storage, $DS_1$ (114), (e.g. solid state drive) may be faster than if the same data operation was performed on a second copy, $d_2$ (122), in the lower speed storage, $DS_2$ (116), (e.g. hard disk drive). For instance, in some data storage systems requiring data to be redundantly stored, latency may be directly correlated with the file copy being employed to support a read operation. Similarly, in some data storage systems, write access to two or more copies of a file may be performed to support a write operation. Requiring multiple accesses of the data storage system (e.g. access to more than one copy of a file) can utilize more resources of the data storage system than a single access to a single copy of the file and increase latency of the I/O operation. Providing individual file descriptors for the each file copy, $d_1$ (120) and $d_2$ (116), respectively, enables individual manipulation and control of each file copy. The individual manipulation provides adaptive control of I/O operations. For example, the descriptor may enable execution of the I/O operation to be performed on the first copy of data, $d_1$ (120), in the high speed storage, $DS_1$ (114), without requiring access (e.g. read and/or write) to the lower speed storage, $DS_2$ (116). Accordingly, enabling individual manipulation and control of file copies within a data storage system provides enhanced utilization of resources within the data storage system during the performance of an I/O operation.

Asynchronous file copies are copies of the same file but at least one copy has a modification which is not present in the other file copy(ies). For example, a write operation has been performed on a first file copy and not the second file copy. Individual file control can lead to asynchronous file copies. The asynchronous file copies can be synchronized by effectuating the modification to the unmodified copies of the file (e.g. second file copy) or removing the modifications from the at least one copy (e.g. first file copy). The synchronization can be performed by, but not limited to, a fire and forget library with query based status, and a hold on close for final method. With respect to file synchronization, the SDS interface (110) can designate all files for synchronization, or in one embodiment, a selection of a subset of the file. For example, the SDS interface (110) may designate a file, such as $d_3$ (124), to be only stored in volatile storage (e.g. cache memory) such as, $DS_3$ (118), and discarded after the I/O operation is performed. The designation includes choosing a storage protocol (e.g. volatile storage only) in a handle associated with the file such as $handle_1$ (126) or $handle_2$ (128). The SDS interface (110) is not limited to individual control of a file or data request and may be provided with group control between two or more files. The group control can be designated in a handle such as $handle_1$ (126) or $handle_2$ (128). Details of the control are described below in FIGS. 2-4. Accordingly, the SDS interface (110) provides adaptive control of I/O operations which enables individual control of each copy of a file, or in one embodiment control of groups of files as the SDS interface designates in the handle.

The SDS interface (110) is supported by one or more handles, such as $handle_1$ (126) and $handle_2$ (128), as shown herein. In one embodiment, the SDS interface (110) may be supported by additional handles, and as such, the quantity shown and described herein is for illustrative purposes. Similarly, the SDS interface (110) may automatically create a new handle after data is written to data storage. In one embodiment, the process of creating the new handle may be manually defined by a requestor. The $handle_1$ (126) is an object configured in a pointer structure and stored in memory, such as memory (106). The pointer structure references data, such as but not limited to, $d_1$ (120), $d_2$ (122), and $d_3$ (124). A handle, such as $handle_1$ (126), enables SDS interface (110) to specify a source for a data request, define a memory location to hold statistics of a data request, and determine an optimal storage location for performance of an I/O operation. The optimal location may vary depending on the data requirements. For instance, in one embodiment, if data to be stored must be accessed quickly, the optimal location will be the quickest to access (e.g. the location with the lowest latency) such as high speed storage, $DS_1$ (114). In another embodiment, if the data must be stored in reliable storage, the optimal location may be persistent storage, such as $DS_2$ (116) and/or require redundancy of the data. Accordingly, the handle supports the SDS interface (110) to adaptively and efficiently control I/O requests to data storage.

The handle, such as $handle_1$ (126), is provided with a plurality of storage protocols which designate how to support I/O operations. The storage protocols include but are not limited to, pathname (130) and flag (132), and in one embodiment, flags combination (combo) (134) and reference handle (136). The pathname (130) designates a reference for data, such as $d_1$ (120), $d_2$ (122), and $d_3$ (124), associated with $handle_1$ (126). In one embodiment, pathname (130) is a location of a corresponding file (e.g. path of the file in the computer system). The $handle_1$ (126) may designate a single file or multiple files in pathname (130). Accordingly, the SDS interface (110) as supported by a handle, such as $handle_1$ (126), is not limited to individual file control.

The SDS interface (110) as supported by a handle, such as $handle_1$ (126), may designate how to control each file designated in pathname (130). The flag (132) designates how data designated in pathname (130) is to be supported during an I/O operation. For example, flag (132) may include one or more instructions which may be, but not limited to, buffer, compress, do not compress, reliability parameter (e.g. level and/or type), read-only, write-only, read-write, do not de-duplicate, de-duplicate, do not baseline (e.g. for de-duplication purposes), and baseline. Accordingly, the handle supports an I/O request by defining a location of data and corresponding storage protocols for the data.

The flags combo (134) designates how to manage the I/O operation. For example, flags combo (134) may include one or more instructions which may be, but not limited to, error tolerance, error resolution procedure, preferred data, preferred data storage, preferred speed, and preferred location. In one embodiment, flags combo (134) defines how to manage code returned from the OS (112) after performance of an I/O operation. The reference handle (136) designates one or more other handles which reference additional associated data. The associated data is data which corresponds to the data identified in pathname (130), such as an alternative copy of the data in pathname (130). In one embodiment, the reference handle (136) identifies a handle, such as handle$_2$ (128), associated with a separate copy of the data referenced in the pathname (130). In one embodiment, handle$_1$ (126) has extended information on a file that is subject of an operating system call including an open command and the operating system, such as OS (112), and returns the information to the SDS interface (110) in response to the open command. Accordingly, storage protocols within each handle enable the SDS interface (110) to directly manage the data storage system at data request granularity and file granularity.

The SDS interface (110), as supported by one or more handles, such as handle$_1$ (126) and handle$_2$ (128), is configured to adaptively control data reliability protocols such as a redundant array of independent disks (RAID) configuration. In one embodiment, the SDS interface (110) adaptively controls the RAID configuration within local data storage, DS$_1$ (114), DS$_2$ (116) and DS$_3$ (118), and in one embodiment, shared data resources (166). The SDS interface (110) determines the level and type of reliability in order to support each data request based on one or more storage protocols within the handle, such as handle$_1$ (126). The SDS interface (110) may control RAID configuration individually for each file, as one or more groups of files, and/or globally across one or more data storages. The data storage system is not limited to a single global reliability protocol and various reliability protocols can be chosen for the data storage system. In one embodiment, the SDS interface (110) partitions DS$_1$ (114) and based on the partitions the SDS interface (110) adaptively controls the storage policies for each partition. Accordingly, reliability protocols may be configured individually for each file within a data storage system.

The SDS interface (110) is configured to adaptively control compression and decompression of data. For instance, if there are two copies of a single file in the data storage system, the SDS interface (110) may compress one copy while the second copy remains in a de-compressed state. In one embodiment, the SDS interface (110) adaptively controls de-duplication of data within local data storage, DS$_1$ (114), and in one embodiment DS$_2$ (116) and DS$_3$ (118). In one embodiment, the SDS interface (110) adaptively controls de-duplication of data within shared data resources (166). The SDS interface (110) may adaptively control de-duplication settings individually for each file, as one or more groups of files, and/or globally across one or more data storages. The adaptive control of de-duplication allows data that is not subject to be de-duplicated to be stored in the same data storage system as data that is subject to be de-duplicated. Defining storage policies at file granularity and data request granularity enables efficient use of available storage space in a data storage system. Accordingly, the SDS interface (110) aligns the granularity of control of I/O operations with the varying requirements of data in the data storage system.

The SDS interface (110) is provided with functionality in order to determine and be responsive to when an I/O operation experiences a failure. An I/O operation failure may be, but is not limited to, a failure to read, write, open, and/or close data. Determination of a failure results in the SDS interface (110) transmitting a failure notification to the requestor. For example, if two copies are to be written to data storage and only one copy was written to data storage, the SDS interface (110) determines whether the failure to write one of the copies is critical based on examination of one or more handles, such as handle$_1$ (126), that is a part of the request. During the examination of handle$_1$ (126), the SDS interface (110) inspects the flag combo (134) in order to determine an error resolution procedure and/or error tolerance. Based on the error resolution procedure and/or error tolerance, the error is processed. The error processing can be ignoring the error, repairing the error, and/or transmitting a failure indication. However, if the I/O operation is a success the SDS interface (110) may transmit a success notification to the requestor. Accordingly, the SDS interface (110) executes and monitors the execution and completion of I/O operations.

Figure 2:
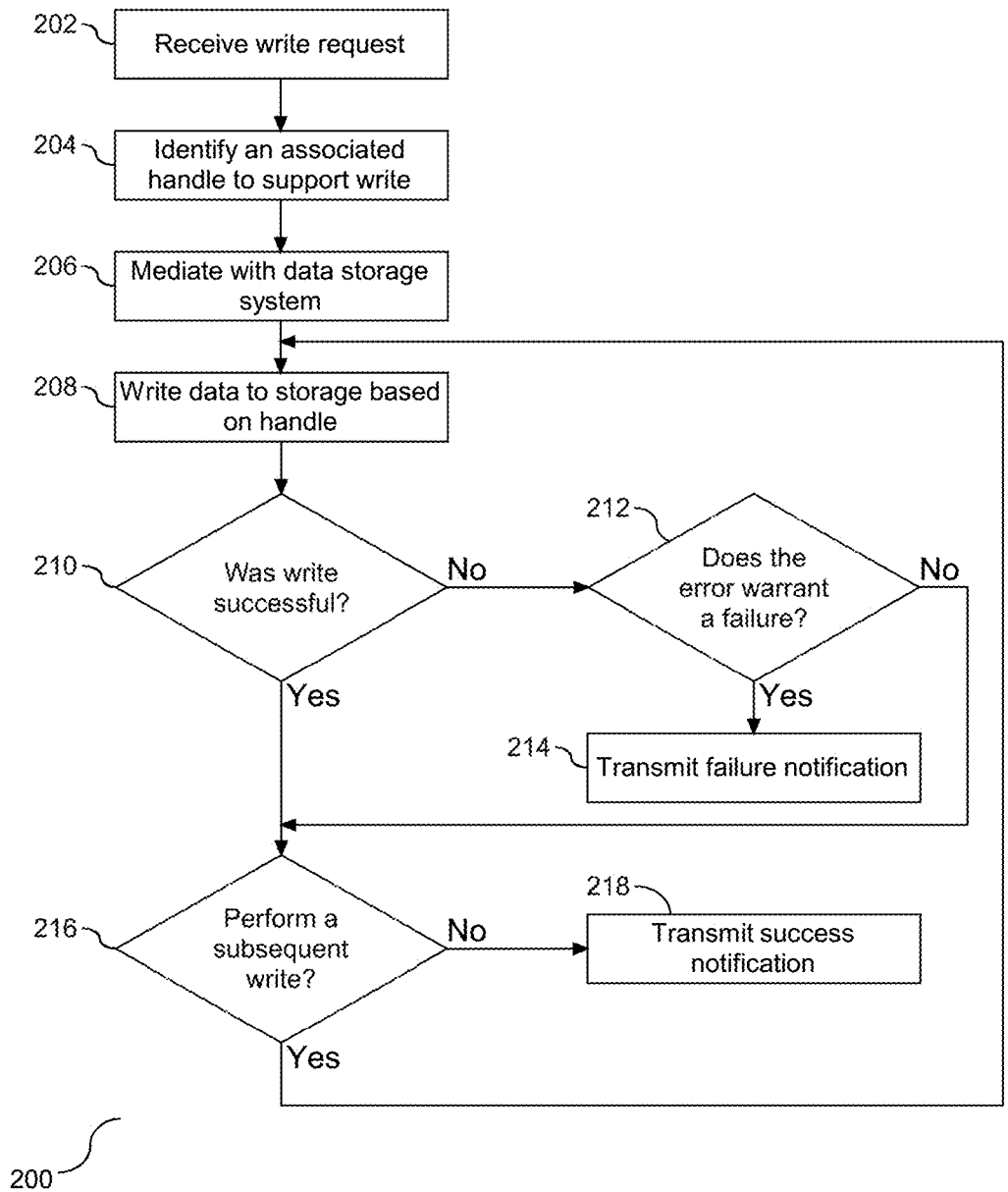
FIG. 2 depicts a flow chart illustrating a process for direct management of a write request by a software defined storage interface.

The SDS interface (110) may support execution of various I/O operations. Referring to FIG. 2, a flow chart (200) is provided illustrating a process for direct management of a write request by a software defined storage (SDS) interface. As shown, a write request is received (202) and one or more handles that are associated with the write request are identified to support the write request (204). The identification of the associated handles may include a comparison of the data request to a file associated with a handle and/or a location associated with the handle. The SDS interface mediates with the data storage system in accordance with the identified one or more handles. (206). In one embodiment, the mediation includes determining one or more parameters of the data storage such as mapping, speed, size, format, available storage space, etc. Accordingly, the handle(s) associated with the request is identified to the support the received write request.

The write request is executed in accordance with the identified one or more handles, including writing data to the data storage system (208). In one embodiment, the data written to data storage system is a file. Execution of the write request includes selecting an execution path to support the data request based on the identified one or more handles. The execution may include defining a mapping between the written data and the data storage system. In one embodiment, the execution path is a pathname stored in the identified one or more handles. Accordingly, a write request is executed according to an associated handle and storage protocols.

After completion of execution of the data request, a determination is made of whether the data write successfully completed (210). If the determination at step (210) is negative and the write was not successful (e.g. an error occurred), a determination is made of whether the error warrants resolution of the failure (212). The determination at step (212) includes inspecting the one or more handles identified at step (204) and utilizing a storage protocol within at least one of the identified one or more handles to make the resolution determination. For example, if the inspection returns a storage protocol that a single error is acceptable and a single error has occurred, the error does not warrant a failure. However, if the inspection returns a storage protocol to fail on a single error, a single error warrants a failure. If the determination at step (212) is positive and the error does warrants a failure resolution, a failure notification is transmitted to the requestor (214). However, following a negative determination at step (212) indicating that the error does not warrant a failure or following a positive response to the determination at step (210), the process continues to step (216) for further error resolution. Accordingly, the data write execution is monitored for errors and error resolution is handled in accordance with an associated handle.

At step (216) it is determined if the write request should be executed another time. In one embodiment, the determination at step (216) includes examining the identified one or more handles and/or the write request for a storage protocol regarding subsequent execution of the write request. For example, if redundancy is designated in the identified one or more handles and/or write request, the write request should be re-executed to create a second copy of the data. In another embodiment, if an error resolution policy is designated to re-attempt upon a write request execution failure, the write request should be re-executed if the previous write operation at step (208) was unsuccessful. In one embodiment, the examination of the identified one or more handles includes returning a second execution path for a subsequent execution of the write request. If the response to the determination at step (216) is negative and a subsequent execution of the write request is not to be performed, a success notification is transmitted to the requestor (218) and the process concludes. In one embodiment, the success notification is a partial success notification which may include information regarding which write operations were successful and which write operations were unsuccessful. However, if the answer to the determination at step (216) is positive the process returns to step (208) and the data is written to the next location as designated in the identified one or more handles and/or the write request. The process continues until the data has been written to the location(s) required by the data request and/or identified one or more handles. Accordingly, the storage protocols for writing data are adapted to meet the requirements of the data request and/or file that are being written to data storage.

Figure 3:
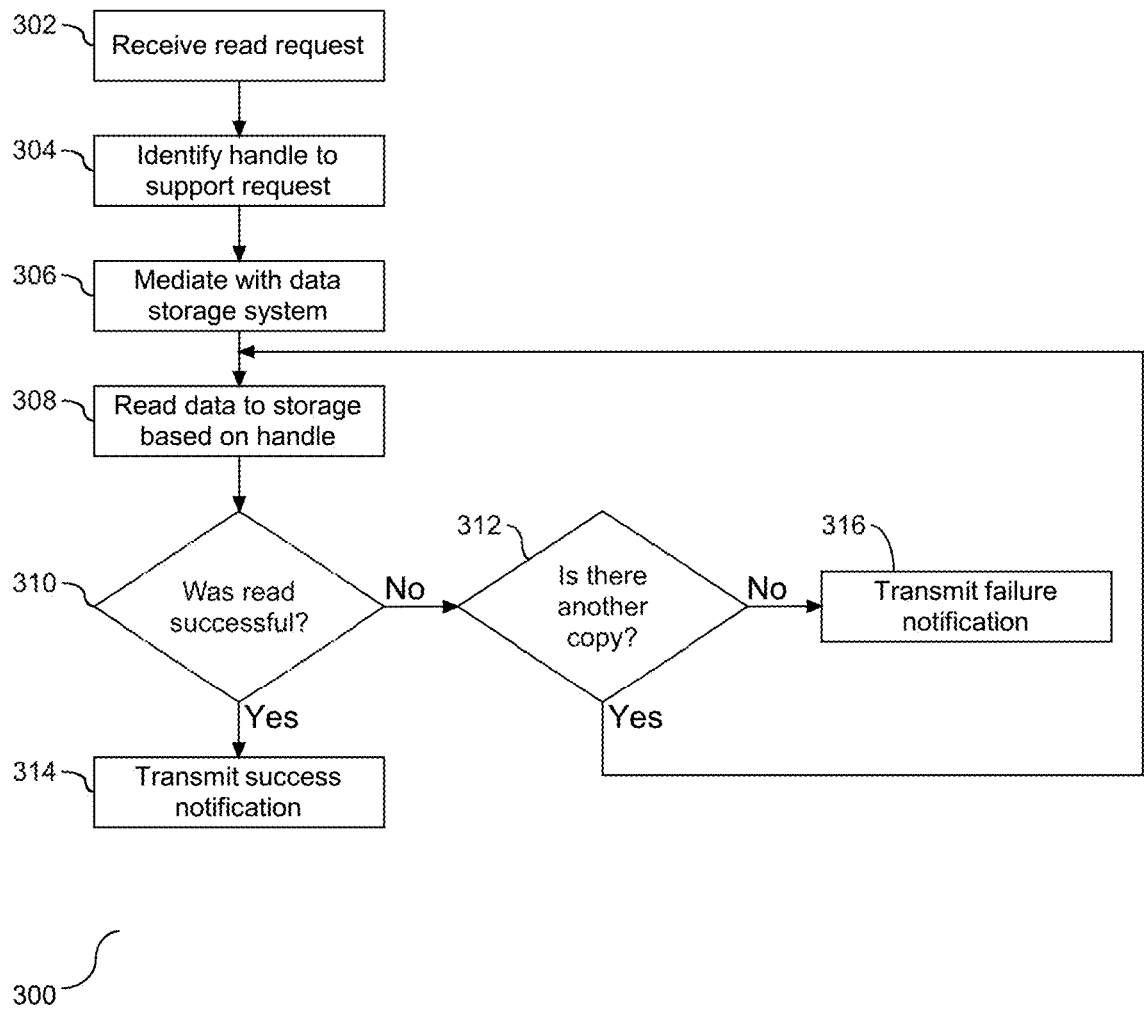
FIG. 3 depicts a flow chart illustrating a process for direct management of a read request by a software defined storage interface.

As shown and described in FIGS. 1 and 2, the SDS interface supports both read and write requests. Referring to FIG. 3, a flow chart (300) is provided illustrating a process for direct management of a read request by the software defined storage (SDS) interface. As shown, a read request is received (302) and one or more handles that are associated with the read request are identified to support the read request (304). The identification of the associated handles may include a comparison of the data request to a file associated with a handle and/or a location associated with the handle. The interface mediates with the data storage system in accordance with the identified one or more handles. (306). In one embodiment, the mediation includes determining one or more parameters of the data storage such as mapping, speed, size, format, available storage space, etc. Accordingly, the handle to support the received read request is identified.

The read request is executed in accordance with the identified one or more handles, including reading data from the data storage system (308). Execution of the read request includes selection of an execution path to support the read request. In one embodiment, the read request may designate a preferred copy of a file to read and/or the quantity of copies of the file to check before reading. In one embodiment, the handle designates a preferred execution path to support the read request which maximizes data transfer speed during the data read. In one embodiment, the execution path is based on a pre-defined mapping of the data to the data storage system. In one embodiment, the data that is the subject of the request is a file. Accordingly, a read request is executed according to an associated handle(s) and storage protocols.

At step (310) a determination is made of whether the data read successfully completed. If the determination at step (310) is positive and the read was successful, a success notification is transmitted to the requestor. However, if the determination at step (310) is negative and the write was not successful (e.g. an error occurred), a determination is made of whether there is another copy of the data to satisfy the request (312). The determination at step (312) includes inspecting the one or more handles identified at step (304) and utilizing a protocol stored in the handle to make the determination. If the determination at step (312) is positive and there is another copy of the data to satisfy the request, the process returns to step (308) to read the data from the copy as designated by the handle(s). However, following a negative determination at step (312) where there is no secondary copy of the data to satisfy the request, a failure notification is transmitted to the requestor (316). Accordingly, data is read from data storage in accordance with the handle(s), and if an error occurs other copies of the data may be employed to satisfy the request.

Figure 4:
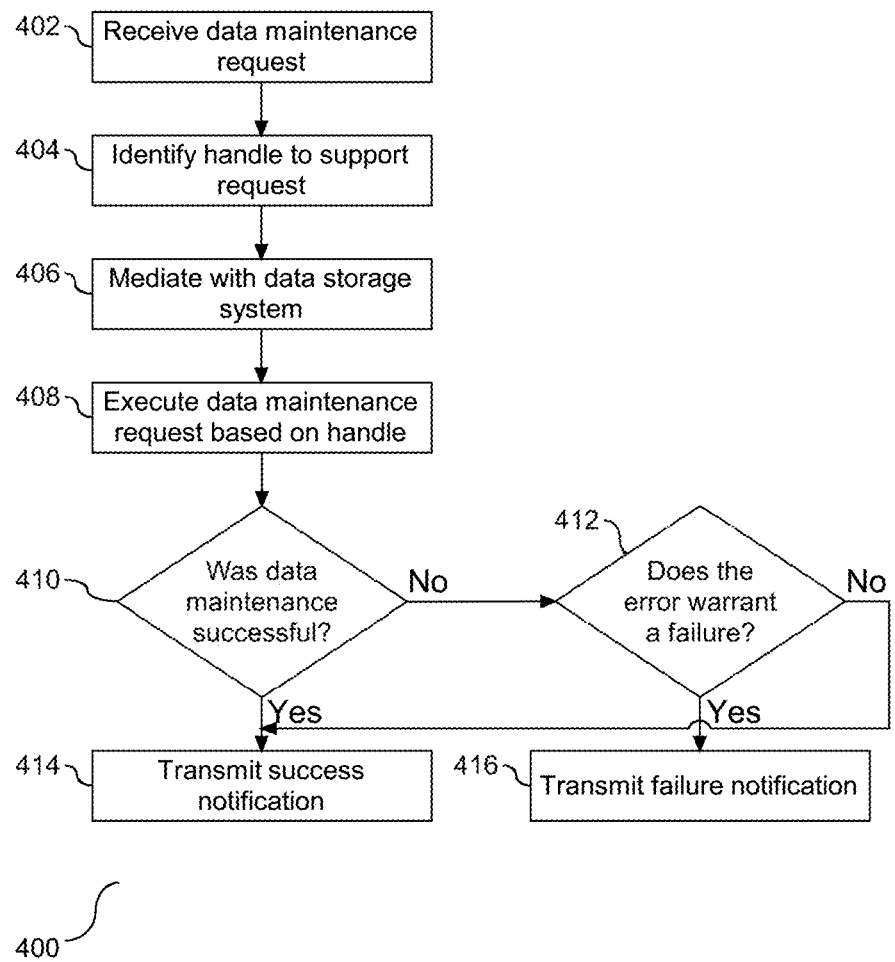
FIG. 4 depicts a flow chart illustrating a process for direct management of a maintenance request by a software defined storage interface.

In addition to supporting read and write request, the SDS interface may also support a data maintenance I/O operation. Referring to FIG. 4, a flow chart (400) is provided illustrating a process for direct management of a maintenance request by the software defined storage (SDS) interface. As shown, a data maintenance request is received (402). The data maintenance request may be, but is not limited to, synchronization, de-duplication, replication, compression, decompression, de-fragmenting. The data maintenance request may be directed toward a piece of data, data, groups of data, or a global performance of the operation on the data storage systems. In response to the receipt of the data maintenance request, one or more handles that are associated with the data maintenance request are identified to support the data maintenance request (404). Identification of the associated handles may include a comparison of the data request to a file associated with a handle and/or a location associated with the handle. The interface mediates with the data storage system in accordance with the identified one or more handles (406). In one embodiment, the mediation includes determining one or more parameters of the data storage such as mapping, speed, size, format, available storage space, etc. Accordingly, the handle(s) to support the received data maintenance request is identified.

The data maintenance request is executed in accordance with the identified one or more handles (408). In one embodiment, the data maintenance request is executed in accordance with a pre-defined mapping between data and the data storage system. In one embodiment, the data maintenance requests spans two or more files wherein at least two handles are identified and the data request is adapted to each file in accordance with their respective handle. For instance, if the maintenance request is a de-duplication operation, a first file is associated with a handle having a storage protocol of "do not de-duplicate" while the second file is associated with a handle having a storage protocol of "de-duplicate". In this described instance, only the second file will be subject to the de-duplication procedure. Accordingly, a data maintenance request is executed according to the associated handle(s).

As shown, at step (410) a determination is made of whether the data maintenance request successfully completed. If the determination at step (410) is positive and the data maintenance was successful, a success notification is transmitted to the requestor (414). However, if the determination at step (410) is negative and the data maintenance was not successful (e.g. an error occurred), a determination is made of whether the error warrants a failure (412). The determination at step (412) includes inspecting the one or more handles identified at step (404) and utilizing a storage protocol stored in the identified one or more handles to make the determination. For example, if the inspection returns a storage protocol that a single error is acceptable and a single error has occurred, the error does not warrant a failure. However, if the inspection returns a storage protocol to fail on a single error, a single error warrants a failure. If the determination at step (412) is positive and a failure is warranted, a failure notification is transmitted to the requestor (416). However, following a negative determination at step (412) where the error notification does not warrant a failure, a success notification is transmitted to the requestor (414). Accordingly, data maintenance operations are adaptively performed in accordance with one or more handles.

Figure 5:
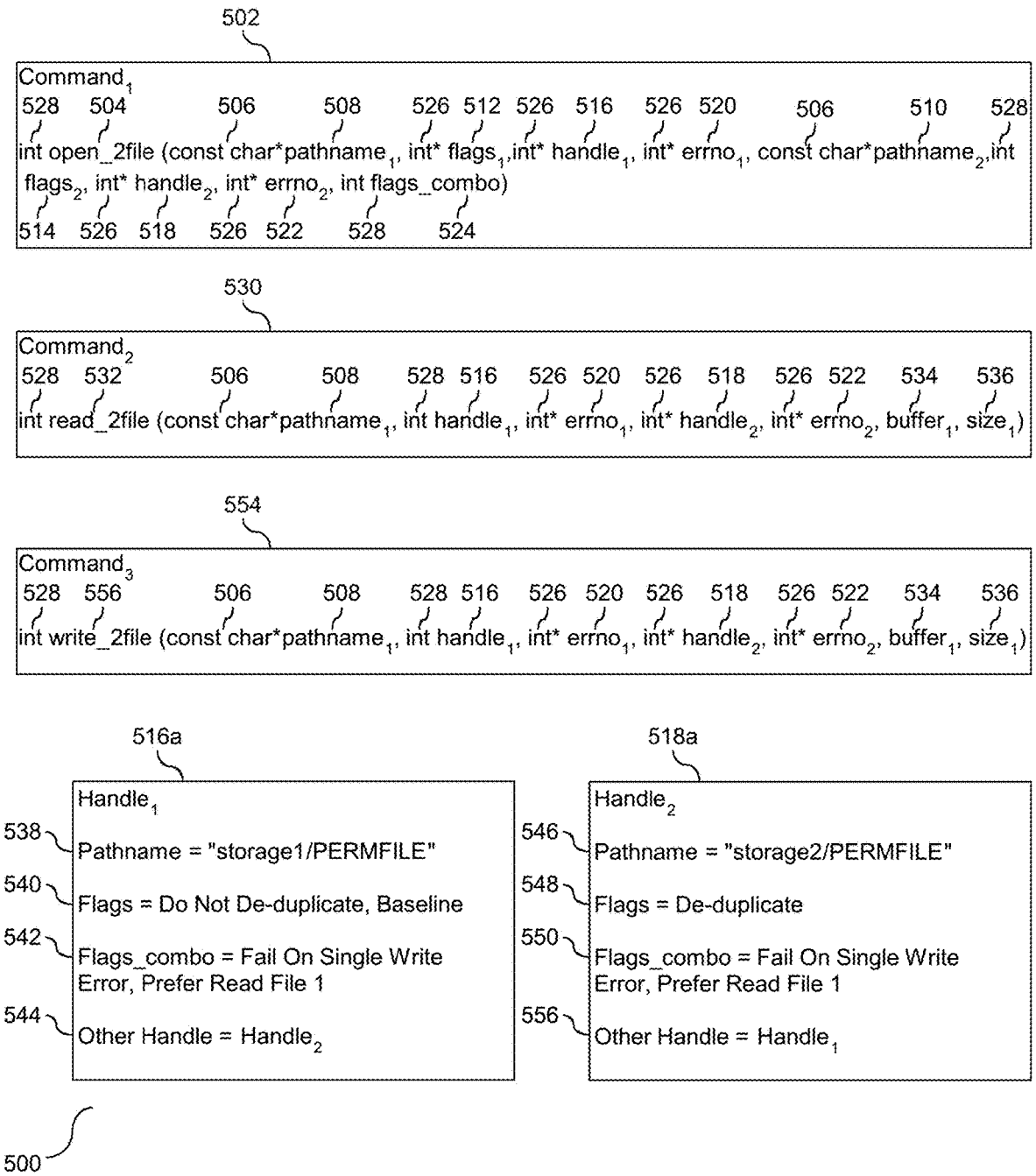
FIG. 5 depicts a block diagram illustrating embodiments of I/O commands for effectuating adaptive control of storage protocols based on one or more handles.

The adaptive direct management of data storage provided in FIGS. 1-4 can be integrated into individual I/O operations. Referring to FIG. 5 a block diagram (500) is provided illustrating embodiments of I/O commands for effectuating adaptive control of storage protocols based on one or more handles. As shown, an I/O command, $command_1$ (502) is provided. $Command_1$ (502) is shown with a plurality of operators including, but not limited to, an open operator (504), one or more path names, such as $pathname_1$ (508) and $pathname_2$ (510), one or more flags, such as $flags_1$ (512) and $flags_2$ (514), one or more handle identifiers, such as $handle_1$ (516) and $handle_2$ (518), one or more error protocols, such as $errno_1$ (520) and $errno_2$ (522), a flags combination (524), a constant, const char* (506) and a scalar function, such as int* (526) and int (528). The open operator (502) is used to designate the type of I/O operation that will be performed when the I/O command, such as $command_1$ (502), is executed. In this instance, the open operator (504) designates an open I/O operation will be performed and in one embodiment, designates that it will be performed on two files. The quantity or type of files designated is for illustration and should not be considered limiting. Accordingly, the I/O command is provided with an operator to designate the type of I/O operation that will be performed during execution of the I/O command.

As shown, $pathname_1$ (508) and $pathname_2$ (510) designate a computer system path for a destination to support execution of the I/O command, such as $command_1$ (502). In one embodiment, $pathname_1$ (508) and $pathname_2$ (510) are a computer system path for a particular file or a group of files. $Handle_1$ (516) and $handle_2$ (518), are handle identifiers used to designate an object, such as a data structure, organized in a pointer structure to support execution of subsequent I/O commands associated with the file referenced in the pathname, such as $pathname_1$ (508) and $pathname_2$ (510). Accordingly, a handle is identified to maintain storage protocols associated with a file in order to support subsequent I/O operations associated with the file.

As shown, $errno_1$ (520) and $errno_2$ (522), designate how to process and return error information received during execution of an I/O command, such as $command_1$ (502). $Flags_1$ (512) and $flags_2$ (514) designate storage protocols to support execution of an I/O operation with an associated file designated in the pathname, such as $pathname_1$ (508) and $pathname_2$ (510). For example, $flag_1$ (512) and/or $flag_2$ (514) may include, but are not limited to, one or more instructions which may be, but not limited to, buffer, compress, do not compress, reliability parameter (e.g. level and/or type), read-only, write-only, read-write, do not de-duplicate, de-duplicate, do not baseline (e.g. for de-duplication purposes), and baseline. Accordingly, the flags designate storage protocols for the files referenced in the pathname of the open command.

Flags combination (524) designates how to manage an I/O command, such as $command_1$ (502). For example, flags combination (524) may include one or more instructions which may be, but not limited to, error tolerance, error resolution procedure, preferred data, preferred data storage, preferred speed, and preferred location. In one embodiment, flags combination (524) defines how to manage code returned from an operating system in response to execution of an I/O command, such as $command_1$ (502). Accordingly, an open I/O command is provided with a plurality of operators in order to directly manage the storage protocols for one or more files designated in the pathname of the I/O command.

After execution of an open I/O command, such as $command_1$ (504), the storage protocols associated with the open I/O command are stored in one or more handles. The information stored in each handle is associated with a file and a handle identifier in an open I/O command, such as $command_1$ (504). For instance, $handle_1$ (516a) is an object used to store information associated with the handle identifier, $handle_1$ (516) after execution of $command_1$ (504). In $command_1$ (502), $flags_1$ (512), $pathname_1$ (508), handle identifier, $handle_2$ (518), and flags combination (526) were associated with handle identifier, $handle_1$ (516). In this instance, $handle_1$ (516a) may include, but is not limited to, a pathname to support execution of an I/O command, a flag for a storage protocol, a combination flag for management of an I/O command and a reference handle (e.g. other handle). For example, $handle_1$ (516a) may include, but is not limited to, a pathname (538) designated to be "storage1/PERM-FILE", flags (540) designated to be "Do Not De-duplicate" and "Baseline", a flags combination (542) designated to be "Fail on Single Write Error" and "Prefer Read File 1", and a reference handle (544) designated to be "$Handle_2$".

Similarly, $handle_2$ (518a) is used to store information associated with handle identifier, $handle_2$ (518) after execution of $command_1$ (504). In $command_1$ $flags_2$ (514), $pathname_2$ (510), handle identifier, $handle_1$ (516) and flags combination (526) were associated with handle identifier, $handle_2$ (518). In this instance, $handle_2$ (518a) may include, but is not limited to, a pathname (546) designated to be "storage2/PERMFILE", a flag (548) designated to be "De-duplicate", a flags combination (550) designated to be "Fail on Single Write Error" and "Prefer Read File 1" and a reference handle (552) designated to be "$Handle_1$". Accordingly, a handle, such as $handle_1$ (516a) and $handle_2$ (518a), includes objects used to maintain storage protocols for associated files.

Subsequent I/O operations such as a read I/O command may use the handles created by the open command. As shown, an I/O command, $command_2$ (530) is provided with a read operator (532), one or more path names, such as $pathname_1$ (508), one or more handle identifiers, such as $handle_1$ (516) and $handle_2$ (518), one or more error protocols, such as $errno_1$ (520) and $errno_2$ (522), a buffer, such as $buffer_1$ (534), a size, such as $size_1$ (536), a constant, const char* (506) and a scalar function, such as int* (526) and int (528). The read operator (532) designates the type of I/O operation to be performed during execution of $command_2$ (530) is a read I/O operation. The handle identifiers, $handle_1$ (516) and $handle_2$ (518), designate handles, $handle_1$ (516a) and $handle_2$ (518a), to be retrieved and used to support execution of the I/O command, such as $command_2$ (530). $Buffer_1$ (534) designates the buffer memory that will be used to support the I/O command, such as $command_2$ (530). $Size_1$ (536) designates the quantity of data that will be used from the buffer memory. Accordingly, a read I/O command to a file is supported by one or more handles associated with the file.

Similarly, a write I/O command is supported with a plurality of operators. For instance an I/O command, $command_3$ (554) is provided with a write operator (556), one or more path names, such as $pathname_1$ (508), one or more handle identifiers, such as $handle_1$ (516) and $handle_2$ (518), one or more error protocols, such as $errno_1$ (520) and $errno_2$ (522), a buffer, such as $buffer_1$ (534), a size, such as $size_1$ (536), a constant, const char* (506), and a scalar function, such as int* (526) and int (528). The write operator (556) designates that the type of I/O operation to be performed during execution of $command_3$ (554) is a write I/O operation. As shown, $command_2$ (530) and $command_3$ (554) are supported by storage protocols designated in one or more handles, such as $handle_1$ (516a) and $handle_2$ (518a). Accordingly, the creation and utilization of handles enables adaptive direct management of a data storage system by I/O commands.

Aspects of adaptive direct management of data storage by an application shown and described in FIGS. 1-5, employ one or more functional tools. In one embodiment, the functional tools are within a functional unit. Aspects of the functional tool, e.g. software defined storage (SDS) interface, and its associated functionality may be embodied in a computer system/server in a single location, or in one embodiment, may be configured in a cloud based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 1-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
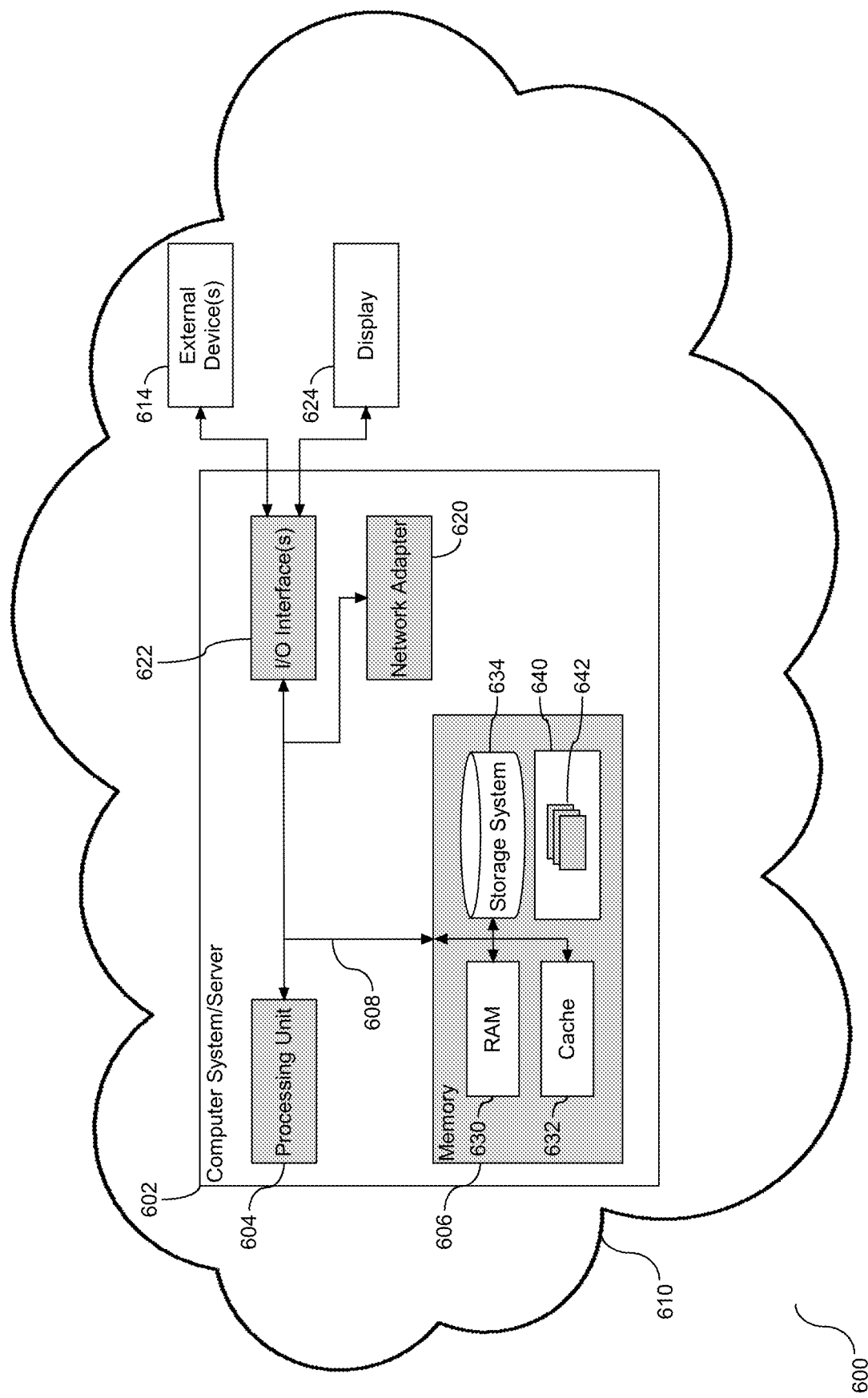
FIG. 6 depicts a block diagram illustrating an example of a computer system/server of a cloud based support system, to implement the system and process described with respect to FIGS. 1-4.

As shown in FIG. 6, host (602) is shown in the form of a general-purpose computing device. The components of host (602) may include, but are not limited to, one or more processors or processing units (604), a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to store and analyze data. For example, the set of program modules (642) may include the modules configured as the SDS interface in order to provide direct management of data storage as shown and described in FIGS. 1-5.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In one embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The present embodiments may be a system, a method, and/or a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

A computer readable signal medium includes a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium is any computer readable medium that is not a computer readable storage medium and that can communicate, propagate, or transport a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

In one embodiment, host (602) is a node (610) of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
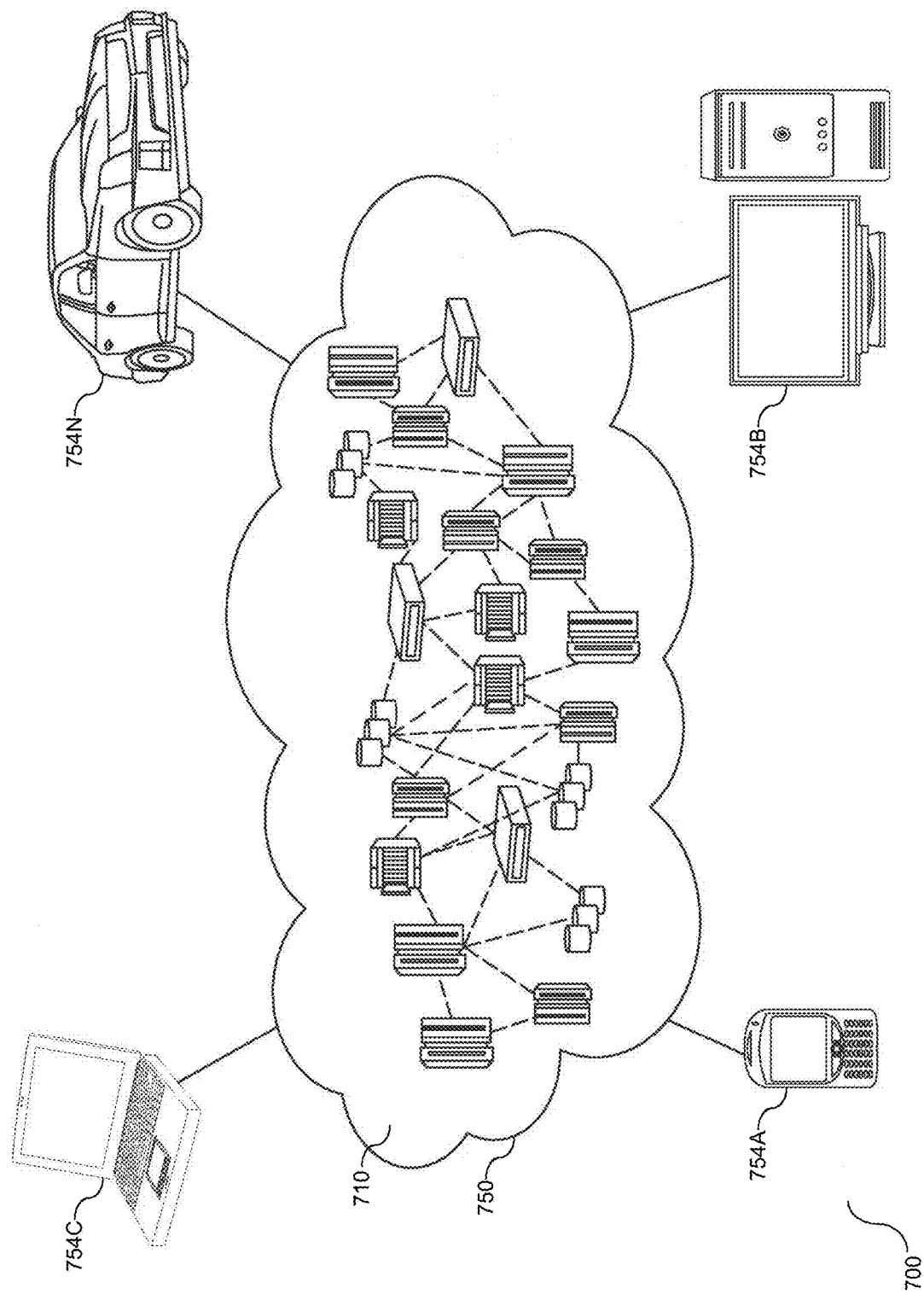
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (750) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
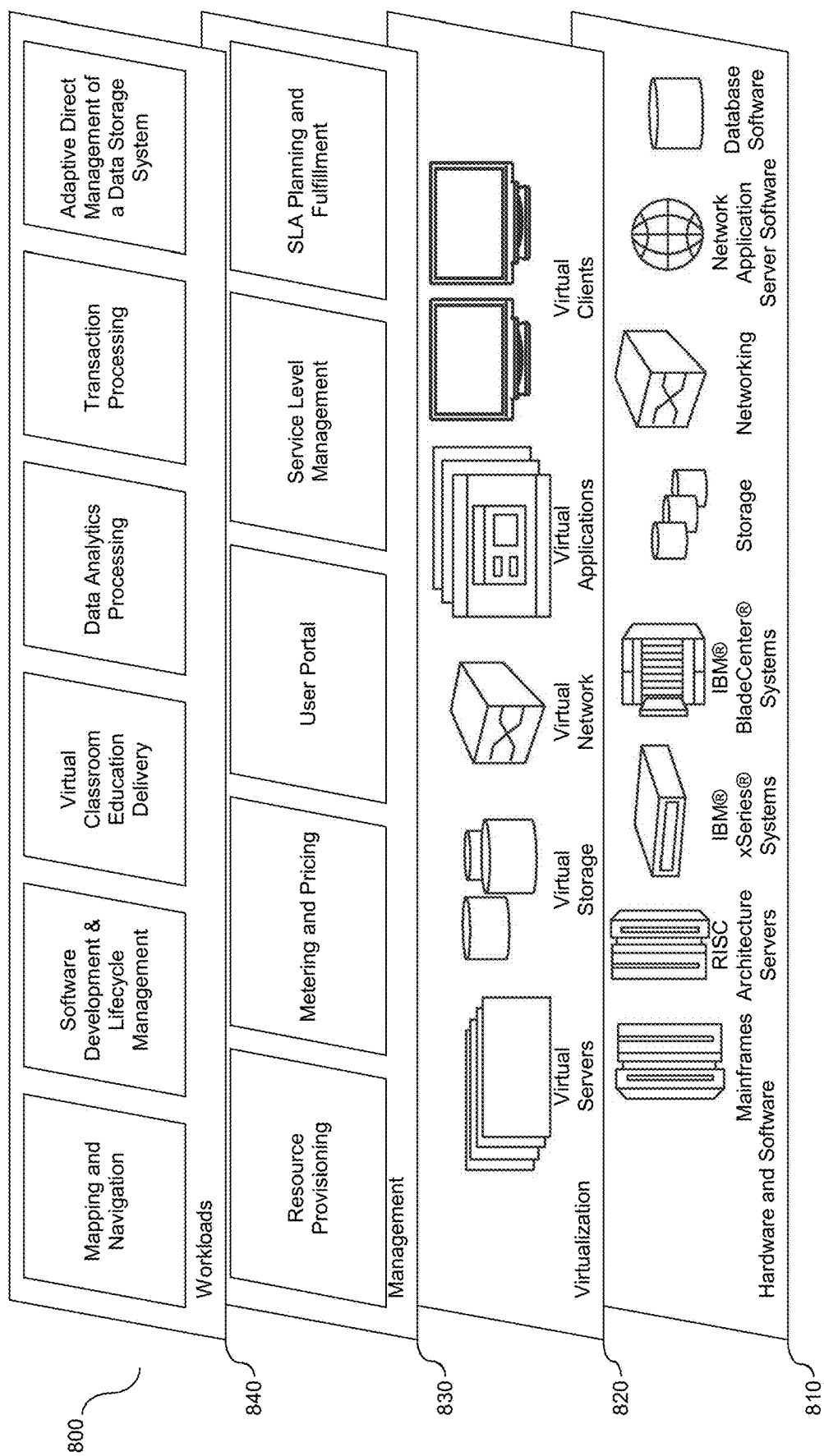
FIG. 8 depicts a block diagram illustrating a set of functional abstraction model layers provided by the cloud computing environment.

Referring now to FIG. 8, a set of functional abstraction layers provided by the cloud computing network of FIG. 6 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840). The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service level management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and adaptive direct management of data storage. Accordingly, the SDS interface shown and described in FIGS. 1-6 may be embodied in the functionality of the workload layer.

As will be appreciated by one skilled in the art, the aspects may be embodied as a system, method, or computer program product. Accordingly, the aspects may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the aspects described herein may take the form of a computer program product embodied in one or more computer readable medium(s) having computer readable program code embodied thereon.

The embodiments are described above with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow chart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flow chart and/or block diagram block or blocks.

The flow charts and block diagrams in the Figures illustrate the architecture, functionality, and operation of possible implementations of systems, methods, and computer program products according to various embodiments. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration(s), and combinations of blocks in the block diagrams and/or flow chart illustration(s), can be implemented by special purpose hardware-based systems that perform the specified functions or acts, or combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The embodiments described herein may be implemented in a system, a method, and/or a computer program product. The computer program product may include a computer readable storage medium (or media) having computer readable program instructions thereon for causing a processor to carry out the embodiments described herein.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmissions, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The embodiments are described herein with reference to flow chart illustrations and/or block diagrams of methods, apparatus (systems), and computer program products. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow chart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

It will be appreciated that, although specific embodiments have been described herein for purposes of illustration, various modifications may be made without departing from the spirit and scope of the specific embodiments described herein. Accordingly, the scope of protection is limited only by the following claims and their equivalents.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single dataset, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of the disclosed embodiments. One skilled in the relevant art will recognize, however, that the embodiments can be practiced without one or more of the specific details, or with other methods, components, materials, etc. In other instances, well-known structures, materials, or operations are not shown or described in detail to avoid obscuring aspects of the embodiments.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated. Storage capability aware software defined storage provides direct management of data storage in order to efficiently stored files with varying storage requirements.

It will be appreciated that, although specific embodiments have been described herein for purposes of illustration, various modifications may be made without departing from the spirit and scope of the embodiments. In particular, the type and quantity of data stored should not be considered limiting. Accordingly, the scope of protection of these embodiments is limited only by the following claims and their equivalents.

What is claimed is:

1. A computer system comprising:
   a processing unit in communication with memory; and
   an interface in communication with the processing unit, the interface to adaptively control Input/Output operations to a storage system including:
   define a mapping between one or more files and one or more storage entities;
   employ one or more handles as an object that references the one or more files, each handle having one or more storage protocols for the one or more files;
   support a data request to the storage system according to at least one handle associated with the data request and the mapping; and
   execute the supported data request, including the interface to:
   mediate with the storage system in accordance with the at least one handle;
   select an execution path of the supported data request responsive to the mediation; and
   resolve one or more errors in accordance with the at least one handle, the one or more errors selected from the group consisting of: read and write.

2. The system of claim 1, wherein the one or more storage protocols include a data operation selected from the group consisting of: de-duplication, baseline, write, read, buffer, error resolution, and compression.

3. The system of claim 2, wherein the data request is a write request and execution of the supported data request further comprising:
   the interface to write data to the storage system at the selected execution path in accordance with the at least one handle.

4. The system of claim 2, wherein the data request is a read request and execution of the supported data request further comprising:
   the interface to read data from the storage system at the selected execution path in accordance with the at least one handle.

5. The system of claim 4, wherein the read request includes a request for a file stored in two or more locations in the storage system and the selection of the execution path is responsive to at least one location which maximizes data transfer speed during the data read.

6. A computer program product for adaptive direct management of a storage system, the computer program product comprising a computer readable storage device having program code embodied therewith, the program code executable by a processor to:
   configure an interface to adaptively control Input/Output operations to a storage system including program code to:
   define a mapping between one or more files and one or more storage entities;
   employ one or more handles as an object that references the one or more files, each handle having one or more storage protocols for the one or more files;
   support a data request to the storage system according to at least one handle associated with the data request and the mapping; and execute the supported data request, including the interface to:
    mediate with the storage system in accordance with the at least one handle;
    select an execution path of the supported data request responsive to the mediation; and
    resolve one or more errors in accordance with the at least one handle, the one or more errors selected from the group consisting of: read and write.

7. The computer program product of claim 6, wherein the one or more storage protocols include a data operation selected from the group consisting of: de-duplication, baseline, write, read, buffer, error resolution, and compression.

8. The computer program product of claim 7, wherein the data request is a write request and execution of the supported data request further comprises program code to:
    write data to the storage system at the selected execution path in accordance with the at least one handle.

9. The computer program product of claim 7, wherein the data request is a read request and execution of the supported data request further comprises program code to:
    read data from the storage system at the selected execution path in accordance with the at least one handle.

10. The computer program product of claim 9, wherein the read request includes a request for a file stored in two or more locations in the storage system and the selection of the execution path is responsive to at least one location which maximizes data transfer speed during the data read.

11. A method comprising:
    configuring an interface to adaptively control Input/Output operations to a storage system including:
        defining a mapping between one or more files and one or more storage entities;
        employing one or more handles as an object that references the one or more files, each handle having one or more storage protocols for the one or more files;
        supporting a data request to the storage system according to at least one handle associated with the data request and the mapping; and
        executing the supported data request, including:
            mediating with the storage system in accordance with the at least one handle;
            selecting an execution path of the supported data request responsive to the mediation; and
            resolving one or more errors in accordance with the at least one handle, the one or more errors selected from the group consisting of: read and write.

12. The method of claim 11, wherein the one or more storage protocols include a data operation selected from the group consisting of: de-duplication, baseline, write, read, buffer, error resolution, and compression.

13. The method of claim 12, wherein the data request is a write request and execution of the supported data request further comprising:
    writing data to the storage system at the selected execution path in accordance with the at least one handle.

14. The method of claim 12, wherein the data request is a read request and execution of the supported data request further comprising:
    reading data from the storage system at the selected execution path in accordance with the at least one handle.

15. The method of claim 14, wherein the read request includes a request for a file stored in two or more locations in the storage system and the selection of the execution path is responsive to at least one location which maximizes data transfer speed during the data read.

* * * * *